United States Patent
Matsuo

(10) Patent No.: US 7,279,865 B2
(45) Date of Patent: Oct. 9, 2007

(54) METHOD AND APPARATUS FOR MONITORING MOTOR STATUS USING INDUCED MOTOR VOLTAGE

(75) Inventor: Takayoshi Matsuo, Brown Deer, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/231,014

(22) Filed: Sep. 20, 2005

(65) Prior Publication Data

US 2007/0063665 A1    Mar. 22, 2007

(51) Int. Cl.
    *H02P 27/04* (2006.01)
(52) U.S. Cl. .................. 318/801; 318/800; 318/806; 318/809; 318/811; 318/799; 318/798; 318/767
(58) Field of Classification Search ............... 318/801, 318/727, 799, 809, 811, 800, 806, 798, 719, 318/767
    See application file for complete search history.

(56) References Cited

U.S. PATENT DOCUMENTS

| | | | | |
|---|---|---|---|---|
| 4,777,422 A | * | 10/1988 | Slicker et al. | 318/800 |
| 4,876,637 A | * | 10/1989 | Mose et al. | 363/37 |
| 5,023,538 A | * | 6/1991 | Mutoh et al. | 318/811 |
| 5,796,235 A | * | 8/1998 | Schrodl et al. | 318/801 |
| 6,014,006 A | * | 1/2000 | Stuntz et al. | 318/804 |
| 6,577,096 B2 | * | 6/2003 | Cho | 318/727 |
| 6,639,380 B2 | * | 10/2003 | Sul et al. | 318/727 |
| 6,650,083 B2 | * | 11/2003 | Jung | 318/701 |
| 6,876,944 B2 | * | 4/2005 | McGaughey et al. | 702/145 |
| 2005/0007044 A1 | * | 1/2005 | Qiu et al. | 318/254 |
| 2006/0132084 A1 | * | 6/2006 | DeLange | 318/802 |
| 2007/0069682 A1 | * | 3/2007 | Ide et al. | 318/719 |

FOREIGN PATENT DOCUMENTS

JP              404071392       *   3/1992

* cited by examiner

*Primary Examiner*—Rita Leykin
(74) *Attorney, Agent, or Firm*—Quarles & Brady LLP; Alexander M. Gerasimow

(57) ABSTRACT

A motor drive unit includes a controller, a voltage inverter, and a speed estimator. The controller is operable to generate at least one command signal for controlling a motor associated with the motor drive unit. The voltage inverter is operable to generate motor drive signals to be applied to the motor based on the command signal. The speed estimator is operable to estimate a speed of the motor when the voltage inverter is not providing the motor drive signals. The speed estimator is further operable to receive two-axis voltage measurements associated with the motor, determine flux angles for the motor based on the two-axis voltage measurements, and estimate the speed based on the determined flux angles.

19 Claims, 4 Drawing Sheets

METHOD AND APPARATUS FOR MONITORING MOTOR STATUS USING INDUCED MOTOR VOLTAGE

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to AC induction motor drives and, more particularly, to a method and apparatus for monitoring motor status using induced motor voltage.

Induction motors have broad application in industry, particularly when large horsepower is needed. In a three-phase induction motor, three phase alternating voltages are impressed across three separate motor stator windings and cause three phase currents therein. Because of inductances, the three currents typically lag the voltages by some phase angle. The three currents produce a rotating magnetic stator field. A rotor contained within the stator field experiences an induced current (hence the term "induction") that generates a rotor field. The rotor field typically lags the stator field by some phase angle. The rotor field is attracted to the rotating stator field and the interaction between the two fields causes the rotor to rotate.

A common rotor design includes a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field. The use of this induced current to generate the rotor field eliminates the need for slip rings or brushes to provide power to the rotor, making the design relatively maintenance free.

To a first approximation, the torque and speed of an induction motor may be controlled by changing the frequency of the driving voltage, and thus, the angular rate of the rotating stator field. Generally, for a given torque, increasing the stator field rate will increase the speed of the rotor, which follows the stator field. Alternatively, for a given rotor speed, increasing the frequency of the stator field will increase the torque by increasing the slip (i.e., the difference in speed between the rotor and the stator fields). An increase in slip increases the rate at which flux lines are cut by the rotor, increasing the rotor generated field and thus the force or torque between the rotor and stator fields.

Referring to FIG. 1, a rotating phasor 10 corresponding to a stator magneto motive force (mmf) generally has an angle, $\alpha$, with respect to the phasor of rotor flux 12. The torque generated by the motor is proportional to the magnitudes of these phasors 10, 12 but is also a function of the angle, $\alpha$. Maximum torque is produced when the phasors 10, 12 are at right angles to each other, whereas zero torque is produced if the phasors 10, 12 are aligned. The stator mmf phasor 12 may therefore be usefully decomposed into a torque producing component 14 perpendicular to rotor flux phasor 12 and a flux component 16 parallel to rotor flux phasor 12.

These two components 14, 16 of the stator mmf are proportional, respectively, to two stator current components: $i_q$, a torque producing current, and $i_d$, a flux producing current, which may be represented by quadrature or orthogonal vectors in a rotating or synchronous frame of reference (i.e., a reference frame that rotates along with the stator flux vector) and each vector $i_q$ and $i_d$ is characterized by slowly varying DC magnitude.

Accordingly, in controlling an induction motor, it is generally desired to control not only the frequency of the applied voltage, hence the speed of the rotation of the stator flux phasor 10, but also the phase of the applied voltage relative to the current flow, hence the division of the currents through the stator windings into the $i_q$ and $i_d$ components. Control strategies that attempt to independently control current components $i_q$ and $i_d$ are generally referred to as field oriented control strategies (FOC).

There are many instances in which it is desirable to measure one or more parameters of motor operation. Typical parameters of interest include rotor speed, rotor direction, back EMF magnitude, and back EMF phase angle. During normal motor operation, adequate assumptions about these parameters can often be made based on the control that is implemented. For example, if a particular speed is commanded in an open loop control scheme, it is often adequate to assume that the control scheme is maintaining the actual motor speed at the commanded speed. In such cases the cost of the system may be reduced by eliminating the need for a rotor shaft speed sensor. The command frequency may be integrated to determine the flux angle, and the rotor speed may be determined by subtracting the slip frequency from the command frequency.

However, situations exist in which such assumptions are not adequate. This is the case, for example, when a motor drive becomes disconnected from a motor (i.e., the power supply to the motor is interrupted, not necessarily the electrical connection between the motor drive and the motor) and open loop control is no longer present. In this case, with no control present, it is difficult to make any assumptions about the motor parameters.

There are a variety of reasons why a motor drive may become disconnected from a motor. For example, there may be a sudden temporary power loss at the power source that supplies power to the motor and motor drive. Alternatively, it may simply be the case that there are times when it is not necessary to operate the motor, and power is not supplied to the motor during these times.

The fact that the motor drive is disconnected from the motor does not prevent the motor from continuing to rotate. For example, if the motor is used in conjunction with a fan in an air conditioning system, a draft in the air conditioning system may drive the motor at an unknown speed and in an unknown direction. Similarly, if the motor is used in a conveyor system, the force of gravity acting on the motor by way of the conveyed articles and friction may drive the motor at an unknown speed and in an unknown direction.

When a motor drive becomes disconnected from a motor, it eventually becomes necessary to reconnect the motor drive to the motor. To perform the reconnection, it is desirable to determine the above-mentioned parameters, namely, rotor speed, rotor direction, back EMF magnitude and/or back EMF phase angle, before the motor drive is reconnected to the motor. Measuring these parameters is useful because it allows the motor drive to be synchronized to the motor, thereby reducing transients at the moment of reconnection. For example, if the speed of the motor is not determined before reconnection, then the motor drive must assume an initial speed of zero when reconnecting to the motor. This assumption may result in severe transients due to the difference between the frequency of the applied voltage and the frequency of the motor-induced back EMF. The transients are especially severe when the initial motor speed is high and when the motor is rotating in a reverse direction as compared to that commanded by the motor drive. If the current control circuitry or current limiting circuitry of the motor drive is not fast enough, the motor drive can fault due to an overcurrent condition. Additionally, when the motor operates as a generator (i.e., when the frequency of the voltage applied to the motor is less than the motor speed), the DC bus voltage may increase to unacceptable levels and cause damage to the power switches in the motor drive.

It is therefore desirable to determine motor parameters to allow the motor drive to be synchronized to the motor when the motor drive is reconnected and thereby to reduce transients upon reconnection. Additionally, when performing a reconnection, it is desirable to measure these parameters in as little time as possible so that operation may continue as smoothly as possible to make the temporary disconnection as imperceptible as possible.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

One aspect of the present invention is seen in a motor drive unit including a controller, a voltage inverter, and a speed estimator. The controller is operable to generate at least one command signal for controlling a motor associated with the motor drive unit. The voltage inverter is operable to generate motor drive signals to be applied to the motor based on the command signal. The speed estimator is operable to estimate a speed of the motor when the voltage inverter is not providing the motor drive signals. The speed estimator is further operable to receive two-axis voltage measurements associated with the motor, determine flux angles for the motor based on the two-axis voltage measurements, and estimate the speed based on the determined flux angles.

Another aspect of the present invention is seen in a method for monitoring a motor disconnected from a motor drive. The method includes receiving two-axis voltage measurements associated with the motor. Flux angles are determined for the motor based on the two-axis voltage measurements. A speed of the motor is estimated based on the determined flux angles.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
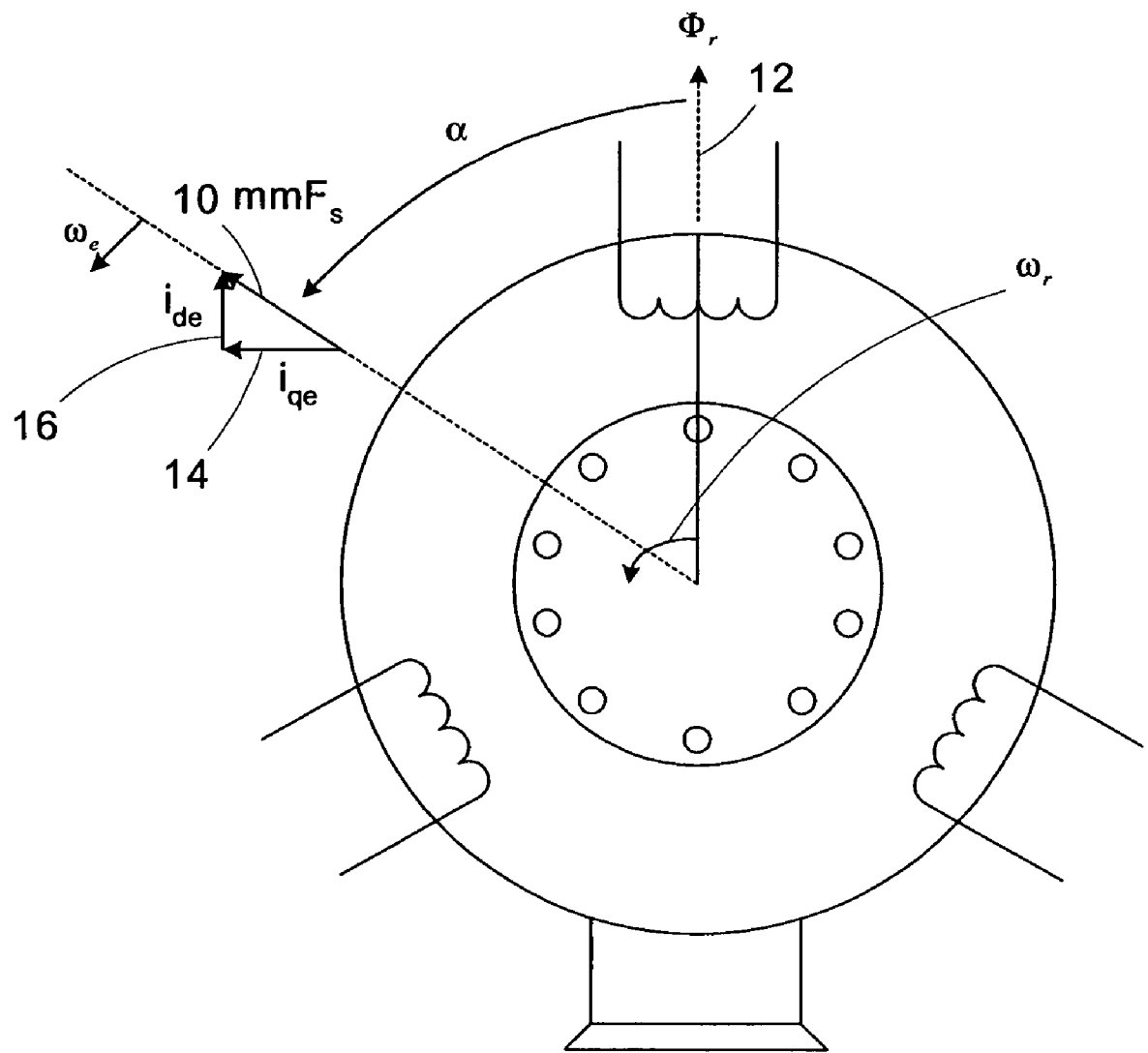
FIG. 1 is a schematic view in cross section of an induction motor showing instantaneous locations of a rotor flux, a stator mmf, and the torque and flux components of the stator mmf.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 2:
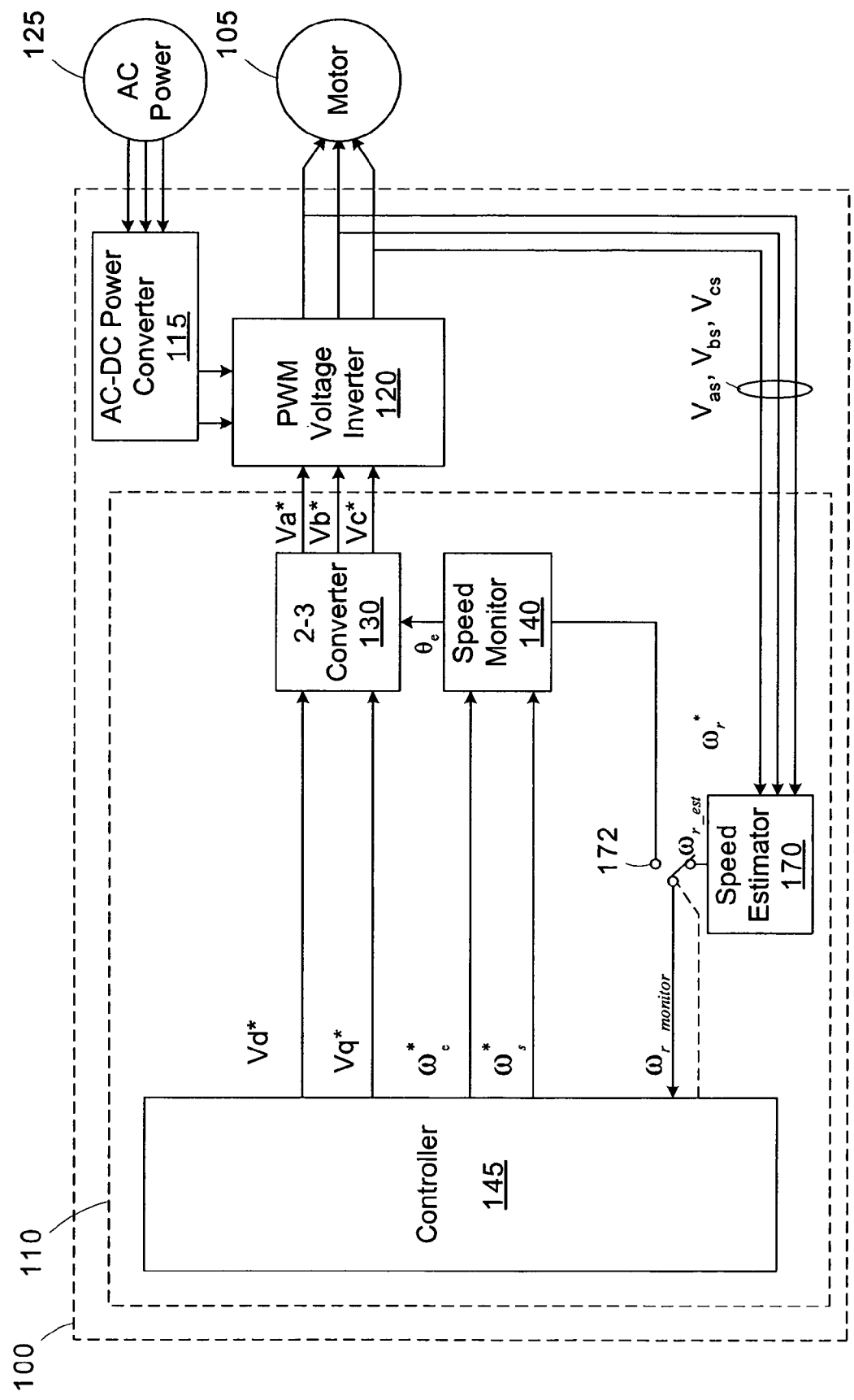
FIG. 2 is a simplified block diagram of a motor drive unit capable of controlling a motor.

Referring now to the drawings wherein like reference numbers correspond to similar components throughout the several views and, specifically, referring to FIG. 2, the present invention shall be described in the context of a motor drive unit 100. The motor drive unit 100 drives an electric motor 105 using an open loop control scheme. However, the application of the present invention is not limited to an open loop scheme, and may be used in a closed loop system with current feedback. The motor drive unit 100 includes a control system 110, an AC to DC power converter 115, and a PWM (Pulse Width Modulation) voltage inverter 120. The control system 110, the power converter 115 and the voltage inverter 120 cooperate to drive the motor 105 using power supplied by a three phase AC power source 125. As will be described in greater detail below, the motor drive unit 100 monitors rotor speed indirectly (i.e., a rotor shaft sensor is not provided). The motor drive unit 100 uses command signals to determine rotor speed while it is driving the motor 105 and estimates rotor speed based on observations of induced voltages when not driving the motor 105.

The control system 110 operates as a field oriented control strategy (FOC) system and regulates the current through the motor 105 by generating voltage commands Vq* and Vd*. (Herein, lower case letters a, b and c denote phase A, phase B, and phase C, respectively, lower case letters q and d denote D phase and Q phase, respectively, and an asterisk denotes a command signal.) Of course, since current and voltage are directly related, the fact that current is controlled means that voltage is simultaneously also controlled, and vice versa.

The control system 110 includes a 2-3 phase converter 130 for converting the d and q phase voltage commands Vq* and Vd* to three phase voltage commands Va*, Vb* and Vc* for use by the voltage inverter 120. A speed monitor 140 is provided for determining the electrical flux angle, $\theta_e$, a necessary component of the transformation and for determining the rotor speed, $\omega_r^*$, while the motor drive unit 100 is driving the motor 105. The speed monitor 140 subtracts the slip frequency, $\omega_s^*$, from the command frequency, ($\omega_e^*$, both of which are provided by the controller 145 to generate the rotor speed, $\omega_r^*$. The speed monitor 140 integrates the command frequency, $\omega_e^*$, to generate the electrical flux angle, $\theta_e$. These operations for determining rotor speed and flux angle based on the command and slip frequencies are well known to those of ordinary skill in the art.

The control system 110 is implemented in firmware executed by a microprocessor. The control system 110 includes a controller 145 which generates the command signals Vq* and Vd*. During normal connected operation, the controller 145 generates the commands based on a speed command received at a user input (not illustrated). Voltage feedback signals, $V_{as}$, $V_{bs}$, and $V_{cs}$ are also provided by voltage sensors associated with the motor 105. Although the controller 145 and other components are illustrated as separate entities, they may be integrated into a single application executed by a microprocessor. Separate units are illustrated to aid in the illustration of the present invention, not to require distinct hardware.

The outputs of the 2-3 phase converter 130 are the voltage commands Va*, Vb* and Vc*. The voltage commands Va*, Vb* and Vc* are received by the PWM voltage inverter 120, which generates PWM control signals based on the voltage commands Va*, Vb* and Vc*. The PWM voltage inverter 120 includes a network of six solid state switches (not illustrated) which are switched on and off in accordance with the PWM control signals. The solid state switches convert the low power PWM control signals to high power current pulses to drive the motor 105 using power supplied by the three-phase AC source 125 via the AC-DC power converter 115. The PWM voltage inverter 120 may also include a conventional PWM dead time compensation circuit (not illustrated) to compensate for the dead time necessary between PWM pulses to prevent short circuiting the power supply.

The control system 110 also includes a speed estimator 170 for estimating the speed of the rotor, $\omega_{r\_est}$, while the motor drive unit 100 is disconnected from the motor 105. The controller 145 selects controls a multiplexer 172 to select the output of the speed monitor 140, $\omega_r$, when the PWM voltage inverter 120 is driving the motor 105, and to select the output of the speed estimator 170, $\omega_{r\_est}$, when the PWM voltage inverter 120 is not driving the motor 105. During a reconnection process, the controller 145 may use the monitored rotor speed, $\omega_{r\_monitor}$, as selected by the multiplexer 172, to reconnect the motor drive unit 110 to the motor 105.

Figure 3:
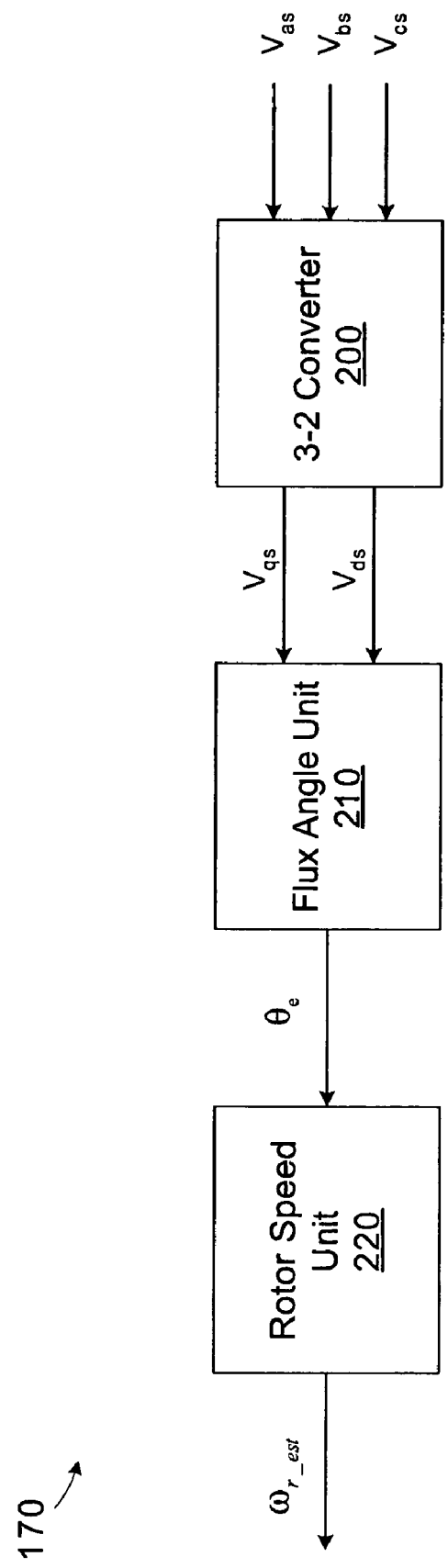
FIG. 3 is a simplified block diagram of a speed estimator in the drive unit of FIG. 2.

Turning now to FIG. 3, a simplified block diagram of the speed estimator 170 is provided. The speed estimator 170 includes a 3-2 phase coordinate transformer 200, a flux angle unit 210, and a rotor speed unit 220. The 3-2 phase coordinate transformer 200 receives the 3 phase motor voltages, $V_{as}$, $V_{bs}$, and $V_{cs}$, and transforms them using the following equations to generate corresponding d-q signals using the following equations:

$$V_{qs} = V_{as}$$

$$V_{ds} = \frac{1}{\sqrt{3}}(V_{cs} - V_{bs})$$

Figure 4:
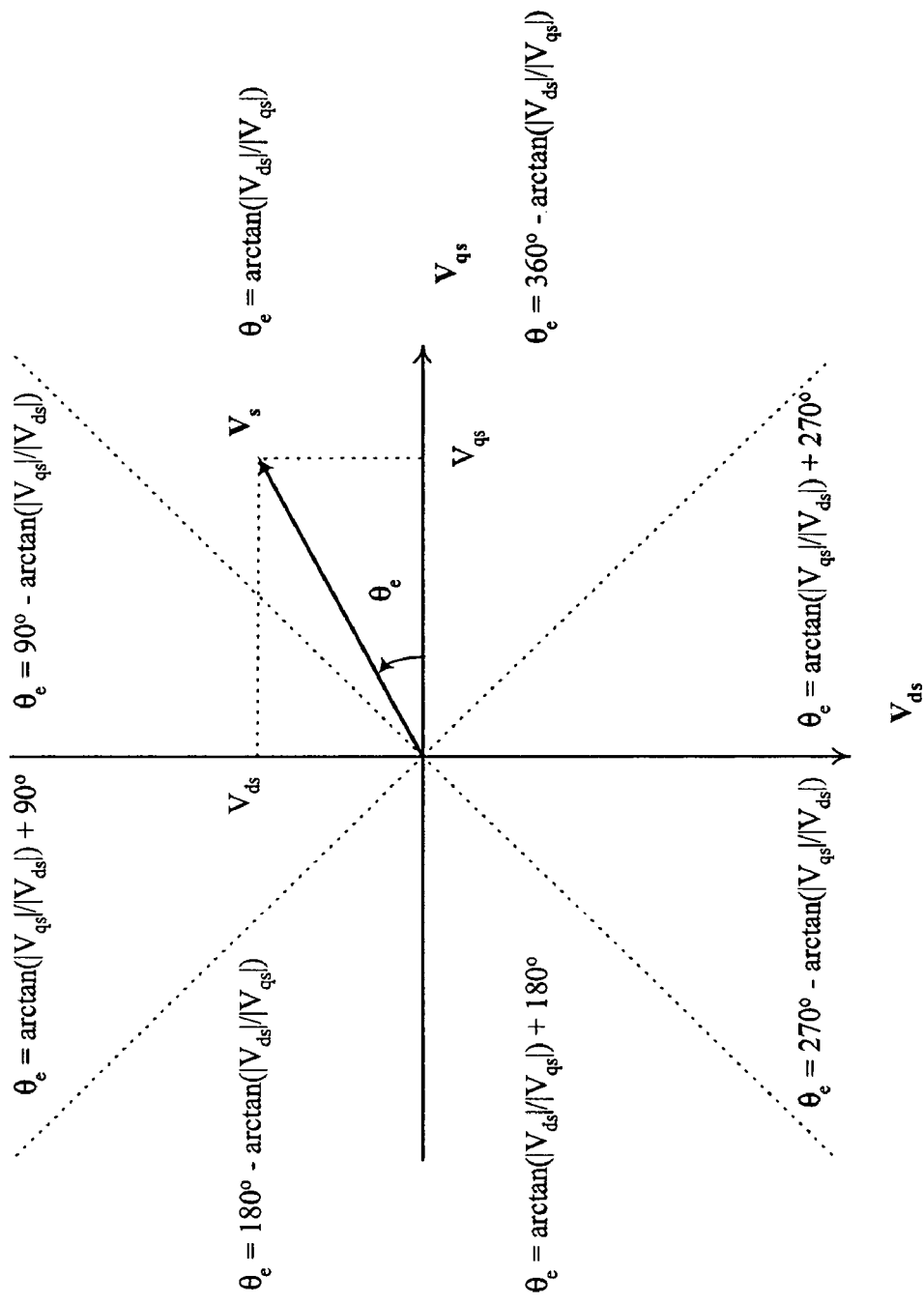
FIG. 4 is a diagram illustrating equations used by the speed estimator of FIG. 3 for estimating a flux angle based on the values of induced voltages.

The flux angle unit 210 determines the flux angle, $\theta_e$, based on the magnitudes of the d and q voltages generated by the 3-2 phase coordinate transformer 200. FIG. 4 illustrates the equations used to determine the flux angle based on the magnitudes and signs of the d and q voltages. For example, if $V_{qs} < V_{ds}$, and both are positive, the equation from the lower portion of the $1^{st}$ quadrant is used:

$$\theta_e = \arctan(|Vds|/|Vqs|)$$

If $V_{qs} > V_{ds}$, and both are positive, the equation from the upper portion of the $1^{st}$ quadrant is used:

$$\theta_e = 90° - \arctan(|Vds|/|Vqs|)$$

When $V_{qs} = V_{ds}$, either equation may be used.

As the signs of $V_{qs}$ and $V_{ds}$ change, the equations provided in the other quadrants may by used. Table 1 below summarizes the equations presented in FIG. 4.

TABLE 1

Flux Angle Determination

| $V_{qs}$ sign | $V_{ds}$ sign | $V_{qs} > V_{ds}$ | Flux Angle Equation |
|---|---|---|---|
| + | + | Yes | $\theta_e = \arctan(|V_{ds}|/|V_{qs}|)$ |
| + | + | No  | $\theta_e = 90° - \arctan(|V_{ds}|/|V_{qs}|)$ |
| − | + | Yes | $\theta_e = 180° - \arctan(|V_{ds}|/|V_{qs}|)$ |
| − | + | No  | $\theta_e = \arctan(|V_{ds}|/|V_{qs}|) + 90°$ |
| − | − | Yes | $\theta_e = \arctan(|V_{ds}|/|V_{qs}|) + 180°$ |
| − | − | No  | $\theta_e = 270° - \arctan(|V_{ds}|/|V_{qs}|)$ |
| + | − | Yes | $\theta_e = 360° - \arctan(|V_{ds}|/|V_{qs}|)$ |
| + | − | No  | $\theta_e = \arctan(|V_{ds}|/|V_{qs}|) + 270°$ |

Returning to FIG. 3, the rotor speed unit 220 estimates rotor speed by averaging two subsequent values of $\theta_e$ over the sampling interval in accordance with the equation:

$$\omega_{r\_est} = \frac{\theta_{e\_n} - \theta_{e\_n-1}}{t_n - t_{n-1}} = \frac{\Delta\theta_e}{\Delta t}$$

The motor drive unit 100 may use the estimated rotor speed information for various purposes including safety or status monitoring, or for reconnecting the motor 105. Techniques for reconnecting the motor drive unit 100 to the motor 105 are well known in the art, once the rotor speed has been determined, and as such, they are not described in greater detail herein. By measuring rotor speed using induced voltage, the need for a rotor speed sensor is obviated, thereby simplifying and reducing the cost of the motor drive unit 100.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A motor drive unit, comprising:
   a controller operable to generate at least one command signal for controlling a motor associated with the motor drive unit;
   a voltage inverter operable to generate motor drive signals to be applied to the motor based on the command signal; and
   a speed estimator operable to estimate a speed of the motor when the voltage inverter is not providing the motor drive signals, the speed estimator being further operable to receive two-axis voltage measurements associated with the motor, determine flux angles for the motor based on the two-axis voltage measurements, and estimate the speed based on the determined flux angles.

2. The motor drive unit of claim 1, wherein the two-axis voltage measurements comprise a d-axis voltage and a q-axis voltage.

3. The motor drive unit of claim 2, wherein the speed estimator is operable to generate the flux angles based on an arctangent of the ratio between the d-axis voltage and the q-axis voltage.

4. The motor drive unit of claim 1, wherein the speed estimator is operable to determine a change in the flux angle over a period of time to estimate the speed of the motor.

5. The motor drive unit of claim 1, wherein the speed estimator comprises a transform unit operable to receive three-phase motor voltage measurements associated with the motor and transform the three-phase motor voltage measurements to generate the two-axis voltage measurements.

6. The motor drive unit of claim 1, wherein the controller is operable to reconnect the motor to voltage inverter based on the determined speed.

7. The motor drive unit of claim 1, wherein the controller is operable to determine the speed of the motor based on the command signal when the voltage inverter is providing the motor drive signals.

8. The motor drive unit of claim 7, wherein the command signal comprises a command frequency signal and a slip frequency signal, and the controller is operable to subtract the slip frequency from the command frequency to generate a rotor frequency and, therefrom, determine a speed of the motor when the inverter is providing the motor drive signals.

9. A method for monitoring a motor disconnected from a motor drive, comprising:
   receiving two-axis voltage measurements associated with the motor;
   determining flux angles for the motor based on the two-axis voltage measurements; and
   estimating a speed of the motor based on the determined flux angles when the motor is not receiving motor drive signals from an inverter configured to drive the motor.

10. The method of claim 9, wherein the two-axis voltage measurements comprise a d-axis voltage and a q-axis voltage.

11. The method of claim 10, wherein determining the flux angles comprises determining the flux angles based on an arctangent of the ratio between the d-axis voltage and the q-axis voltage.

12. The method of claim 9, further comprising determining a change in the flux angle over a period of time to estimate the speed of the motor.

13. The method of claim 9, further comprising:
   receiving three-phase motor voltage measurements associated with the motor; and
   transforming the three-phase motor voltage measurements to generate the two-axis voltage measurements.

14. The method of claim 9, further comprising reconnecting the motor to a motor drive unit based on the determined speed.

15. The method of claim 9, further comprising:
   generating at least one command signal for controlling the motor when connected to the motor drive; and
   determining the speed of the motor based on the command signal when so connected.

16. A system, comprising:
   means for receiving two-axis voltage measurements induced by a motor;
   means for determining flux angles for the motor based on the two-axis voltage measurements; and
   means for estimating a speed of the motor based on the determined flux angles when the motor is not receiving motor drive signals from an inverter configured to drive the motor.

17. A system for controlling a motor comprising:
   a controller configured to generate at least one command signal for controlling a motor associated with the motor drive unit;
   a voltage inverter configured to generate motor drive signals to be applied to the motor based on the command signal; and
   a speed estimator configured to monitor voltage signals associated with the motor to determine two-axis voltage measurements associated with the motor, determine flux angles for the motor based on the two-axis voltage measurements, and estimate an operational speed of the motor when the voltage inverter is not providing the motor drive signals.

18. The system of claim 17, wherein the two-axis voltage measurements comprise a d-axis voltage and a q-axis voltage induced by the motor and wherein the speed estimator is configured to determine the flux angles based on an arctangent of a ratio between the d-axis voltage and the q-axis voltage.

19. The system of claim 17, wherein the speed estimator is configured to estimate the operational speed of the motor when the voltage inverter is not providing the motor drive signals by averaging two values of flux angles over a predetermined sampling interval.

* * * * *